United States Patent Office 2,942,611
Patented June 28, 1960

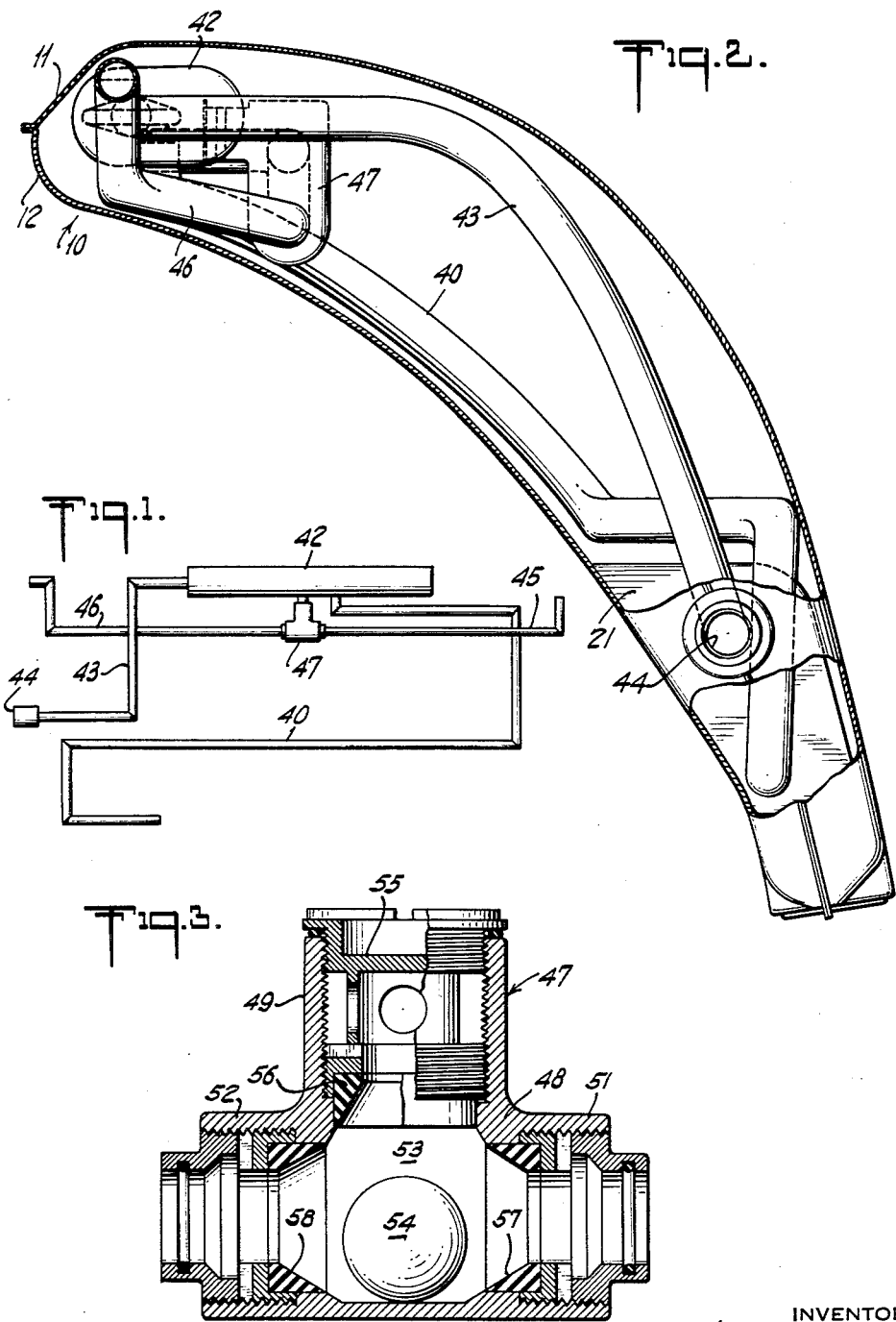

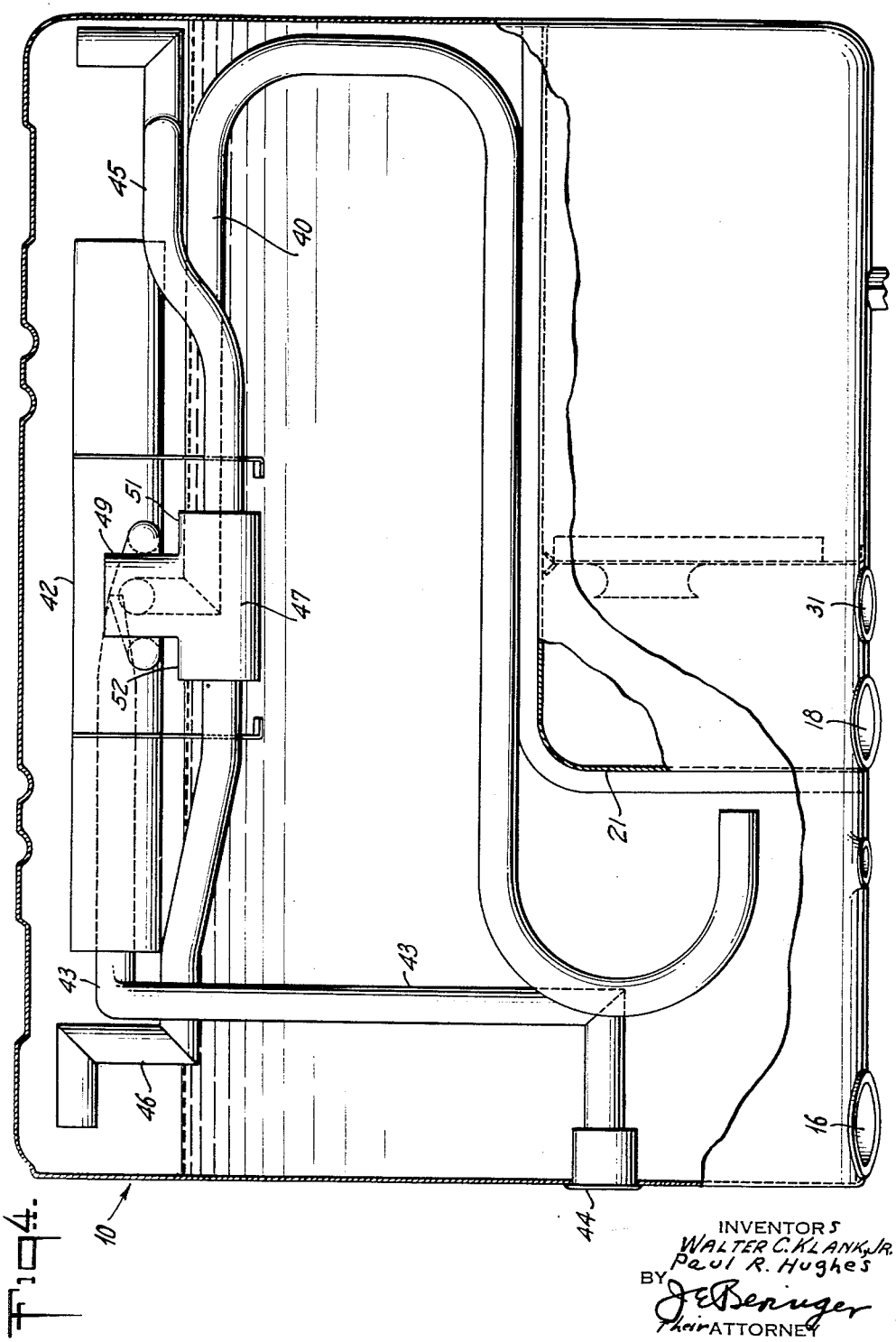

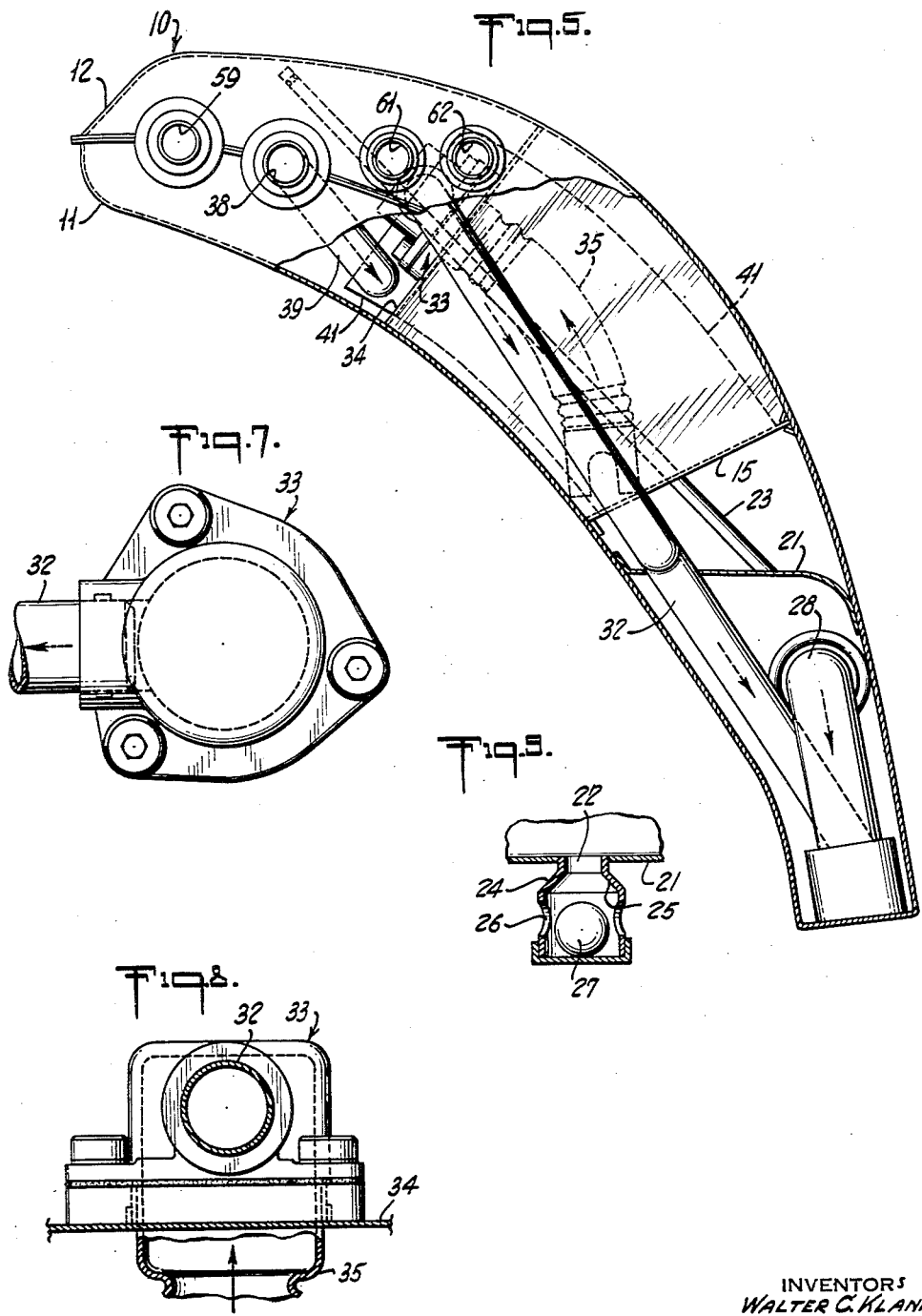

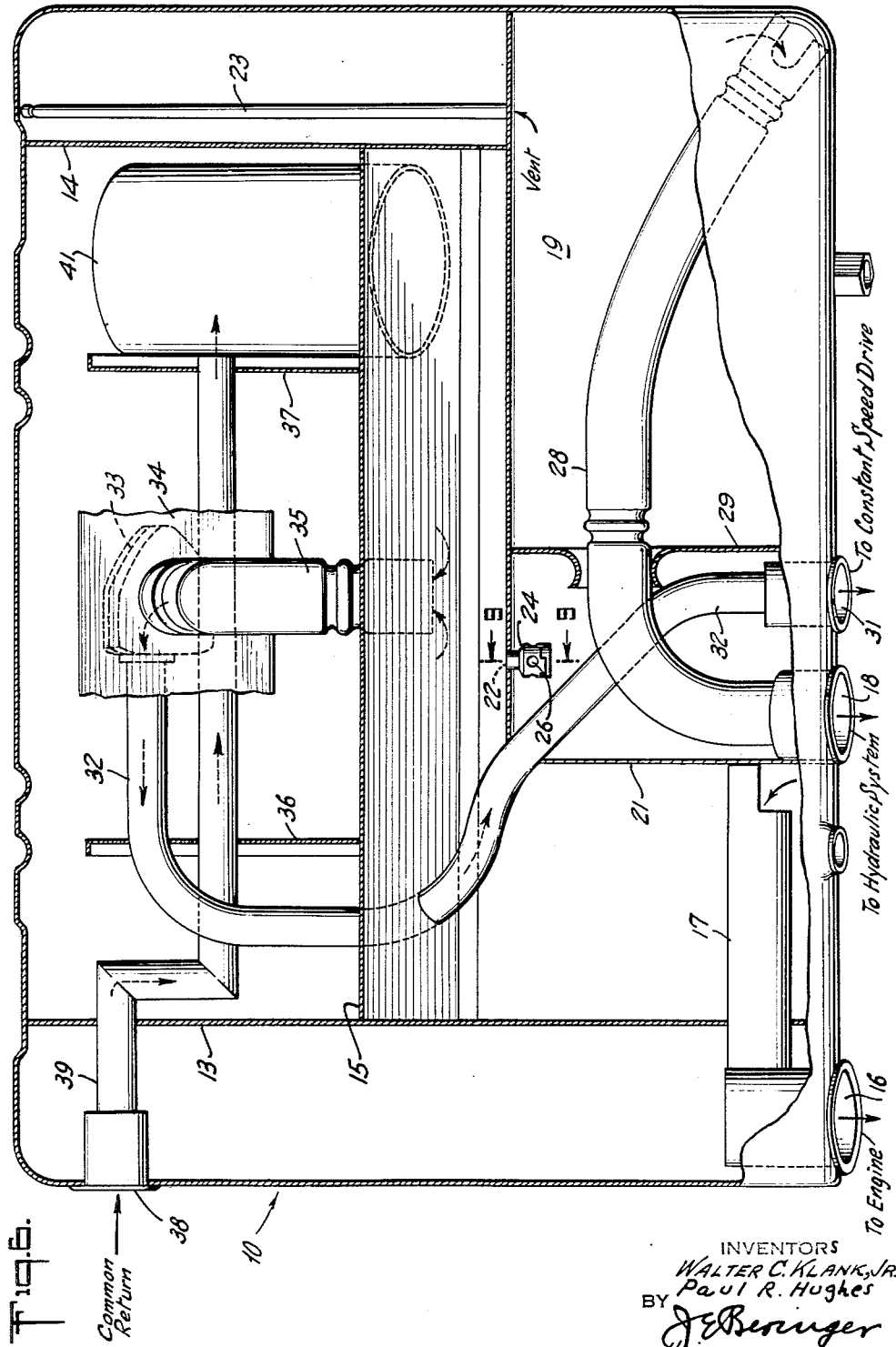

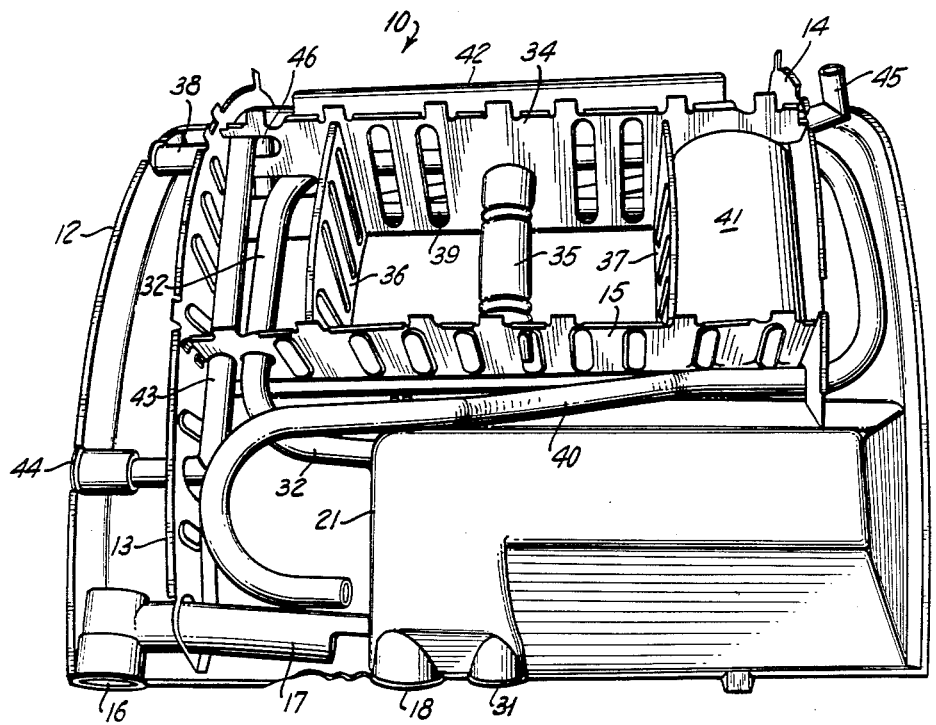

2,942,611

VENTED LIQUID STORAGE TANK WITH PRIORITY SYSTEM OF SUPPLY

Walter C. Klank, Jr., Dayton, and Paul R. Hughes, Englewood, Ohio, assignors to United Aircraft Products, Inc., Dayton, Ohio, a corporation of Ohio Filed Feb. 5, 1958, Ser. No. 713,460

19 Claims. (Cl. 137—43)

This invention relates to tanks storing a liquid and useful in vehicles such as aircraft wherein the tank assumes normal, climbing, diving and inverted attitudes in correspondence with the movement or flight of the aircraft. While not so limited, the invention has especial application to oil supply systems in aircraft wherein an oil is taken from the tank to a place of use and then returned to the tank for storage and subsequent re-use.

In tanks and systems as described, the oil in its circulation entrains varying amounts of air. It is a design objective to construct the tank with the greatest possible ability to separate such entrained air from the oil and to vent it to the atmosphere.

An object of this invention is to incorporate in a tank as described means for supplying liquid from a single tank to a plurality of systems utilizing such liquid, it being proposed to supply such systems according to a priority arrangement by which a continuing loss of liquid from the tank will progressively affect the several systems utilizing the liquid.

Another object of the invention is to provide separated outlets from the tank for flow to the several described systems, at least one of which outlets is constructed and arranged to be supplied with liquids in any described attitude of the tank.

A further object of the invention in keeping with the priority concept, is to prevent damage in one of the supplied systems, bringing about a loss of liquid, from draining the entire liquid supply in the tank.

Still another object of the invention is to incorporate in the tank a semi-closed circuit, in which flow to one of the supplied systems will be continued during inverted attitudes only for a period of time long enough to consume a predetermined quantity of the liquid in the tank.

A still further object of the invention is to present a generally new vent system featuring an air chamber within the tank and stationary vent tubes which communicate with the air chamber and which reach into different portions of the tank interior.

A still further object of the invention is substantially to preclude or limit a loss of oil from the tank by escape through the vent system.

Other objects and structural details of the invention will appear from the following description when read in connection with the accompanying drawings, wherein:

Fig. 1 is a diagram of the vent system of the tank in accordance with the illustrated embodiment of the invention;

Fig. 2 is a view in side elevation of a tank in accordance with the illustrated embodiment of the invention, partly broken away to show the vent system, the elements of the liquid pick up and return systems being omitted;

Fig. 3 is a detail view in longitudinal section, of a three-way valve associated with the vent system;

Fig. 4 is a view of the tank of Fig. 2, partly broken away to show the vent system;

Fig. 5 is a view similar to Fig. 2 showing elements of the liquid pick up and return systems, the elements of the vent system being omitted;

Fig. 6 is a view similar to Fig. 4, showing the liquid pick up and return systems with the elements of the vent system omitted;

Fig. 7 is a detail view in side elevation of the mounting for a weighted flexible tube used in one of the liquid pick up systems;

Fig. 8 is an end view of the mounting of Fig. 7;

Fig. 9 is a detail view of a valve comprised in one of the liquid supply systems of the tank, being a sectional view taken substantially along the line 9—9 of Fig. 6; and Fig. 10 is a top plan view of the tank with one cover removed and some of the parts being obscured therein, it being the purpose of this view to show generally how the elements of the liquid flowing system and the vent system are fitted into the tank, the other views being in the main devoted to one system or the other.

Referring to the drawings, the invention is disclosed as embodied in a tank for use in aircraft in a specific installation in which it provides a means of supplying oil to the lubricating system during certain flight attitudes and further provides a means of supplying oil to the hydraulic system and constant speed drive system during all flight attitudes. Also, provision is made to reduce the percentage aeration (by volume) to a minimum compatible with the functioning of the three systems which utilize the tank oil, and still further to vent the interior of the tank above the liquid level therein in all flight attitudes.

As indicated, the tank comprises a shell 10 which may be comprised of superposed elements 11 and 12 and which has a configuration dictated at least in part by the dimensions of the space in the aircraft to receive the tank. Internal bulk heads, some of which will hereinafter be more particularly identified, strengthen the tank shell and in the walls thereof appear access doors, oil inlet and outlet ports, vent openings and the like. It will be understood that the tank is adapted to be connected through suitable pipe lines to systems utilizing the stored liquid therein, and it will still further be understood that the tank is rigidly mounted within the aircraft body as to the engine, so that in effect it becomes a part of the aircraft and assumes various level, tilted and inverted positions corresponding to normal, climbing, diving and inverted attitudes of flight of the aircraft. The tank has a broadly rectangular configuration and as installed in the aircraft has its major axis in a plane parallel to the direction of flight. Thus, one end thereof, for example the right hand end of the tank as viewed in Figs. 4 and 6, may be considered to be the forward or leading end of the tank while the opposite end thereof may be considered to be the rearward or trailing end. The tank also may be considered to have a normal lower portion and a normal upper portion having regard to the attitude of the tank in level flight.

As indicated in Fig. 6, the interior of the tank shell is subdivided by internal partitions serving as bulk heads and to define compartments, there being for example vertical walls 13 and 14 and an intermediate horizontally disposed wall 15. With an exception to be noted hereinafter, all of the several internal walls or bulk heads are perforated or otherwise open to a free flow of the contained liquid therethrough.

Also referring to Fig. 6, the engine lubrication system is supplied by way of a port 16 located in the tank shell in the normal lower portion thereof. A relatively short tube 17 communicates with the port 16 and is open at its opposite end to admit liquid from the interior of the tank for discharge by way of the port 16. The tube 17 is parallel to and near the bottom of the tank and is constructed and arranged with a view to inhibit vortexing.

Further, it constitutes a fixed liquid pick up point located in a position calculated to supply the lubricating system with liquid in certain attitudes only of the aircraft. For example, in the illustrated instance the lubricating system will be supplied with 20% of the usable liquid capacity of the tank in (a) a level flight position with the tank level or inclined 20° to either side; (b) a diving angle of zero to 30° with up to 10° inclination on either side; and (c) zero to 45° climbing angle with up to 10° inclination on either side.

It is contemplated that the hydraulic system, which is supplied by way of an outlet port 18 in the bottom of the tank shell, shall operate as a semi-closed circuit, to utilize liquid contained within a compartment 19 in the interior of the tank shell. The compartment 19 is defined by the walls of the shell in conjunction with imperforate internal partition means 21 disposed in the lower portion of the tank shell in enclosing relation to the outlet port 18. A part of the partition wall 21 is in substantially parallel relatively elevated relation to the normal bottom of the tank shell. In this portion is an opening 22 communicating the compartment 19 with the interior of the tank shell and the body of liquid contained therein. A vertically rising tube 23 extends from the compartment 19 to the normal upper portion of the tank interior and serves as a vent for the compartment. Installed in the opening 22 is a valve cage 24 (see Fig. 9) having tapered walls defining a valve seat 25 and further having a series of lateral openings 26 communicating the interior of the valve cage with the interior of the compartment 19. Within the cage 24 is a freely movable relatively heavy ball 27. Normally the ball 27 occupies a position as shown at the bottom of the cage 24, off of the seat 25. In an inverted position of the tank, however, the ball will drop upon the seat 25 and close off communication between the interior of the tank proper and the interior of the compartment 19. It will be understood from the construction and arrangement of parts that the compartment 19 tends normally to serve merely as a part of the tank interior since the liquid within the tank may flow freely through opening 22 into the compartment. In an inverted position of the parts, however, the compartment 19 is cut off from the tank interior and the liquid contained therein is trapped and held within the compartment except to the extent that it may be carried off by way of the system outlet 18. In this connection, the outlet port 18 communicates with one end of a weighted flexible tube 28 extending through and in part supported by a vertical wall 29 and reaching into the far end of the compartment 19 in such manner as to pick up liquid within the compartment in any attitude of the tank. The size of the compartment 19 is predetermined in relation to the demands of the system supplied therefrom to furnish liquid to the system for a predetermined length of time only, for example one minute, while in inverted flight position.

The constant speed drive system is supplied by way of an outlet port 31 in the bottom of the tank shell. One end of a tube 32 communicates with the outlet port 31, the tube 32 rising to an intermediate point in the tank interior where it is received in a fitting 33 mounted on a horizontal partition member 34 which, as indicated in Fig. 5, is similar to and spaced from the aforementioned partition member 15. Within the fitting 33, the tube 32 communicates with one end of a weighted flexible tube 35 which is received in the fitting from the opposite or underside of the partition 34 and which hangs in a suspended position within the tank interior, its lower end reaching toward the normal lower portion of the tank interior. Liquid within the tank may enter the described outer end of the flexible tube 35 and flow by way of the fitting 33 and tube 32 to the outlet port 31 and thence to the constant speed drive system. Being flexible, the tube 35 tends to move in response to changing flight attitudes whereby to follow the shifting movements of the contained body of liquid within the tank shell. The movements of the tube 35 are limited and controlled by the horizontal partitions 34 and 15, and by parallel spaced apart vertical partitions 36 and 37 in such manner that the tube 35 is not required itself to sustain its own weight, and also to the end that in any flight attitude the extent of motion of the outer end of the tube into the tank interior is limited. The placement of the several bulk heads or partitions is such that in any flight attitude should a leak develop in the constant speed drive system the tube 35 and associated parts would be incapable of draining the tank to less than a predetermined amount. According to a feature of the invention, this amount is the same in any flight attitude, it being proposed for example that the constant speed drive system cannot drain the storage tank to less than two and one-half gallons of liquid, thus leaving a quantity of liquid in the tank for operation of the hydraulic system and for supply to the engine lubrication system.

In the latter regard, it may be seen that the arrangement of the pick up devices for the several described systems is such as to establish a priority of continuing supply. Thus, the placement of the compartment 19, and particularly of the port or opening 22 therein is such as to permit a continuing supply of liquid to this compartment from the tank interior after supply to the constant speed drive by way of tube 35 has been interrupted. Similarly, a drop in liquid level within the tank shell below the plane of the opening 22 will limit continued operation of the hydraulic system and will prevent re-filling of the compartment 19, while leaving a quantity of liquid for supply to the lubrication system by way of port 16. By way of example, the compartment 19 is so situated within the tank that should a leak develop in the hydraulic system the tank would not be drained to less than one gallon in a level flight attitude.

The systems utilizing liquid from the tank return the used liquid to the tank for re-use, there being no loss of liquid contemplated under normal circumstances except that which may be consumed by forces of heat, friction and the like.

An inlet port 38 in the normal upper portion of the tank provides a common return from the several systems, the liquids from such systems being joined in advance of the port 38 and returning to the tank interior by common means. In addition to the port 38 such common means includes a tube 39 extending from the port 38 to an open ended cylinder 41 disposed in a generally vertical fashion in the tank interior in an intermediate position therein. The cylinder 41 serves as a deaerator. The liquid returned thereto is directed into the cylinder at a tangent in such manner as to descend through the cylinder in a swirling motion facilitating the release of air entrained with the returning liquid, which air rises through the open upper end of the cylinder into the normal upper portion of the tank above the liquid level therein. The deaerator 41 maintains an orderly flow essential to good deaeration and minimizes surging, foaming and vortexing of the liquid as it returns to the tank. In addition, it prevents high velocity direct internal flow from the return inlet to the three system outlets.

As shown in Figs. 2 and 4, in the venting of the tank there is used an air chamber 42 situated in the normal upper portion of the tank and closed except for limited communication with the interior and the exterior of the tank shell as hereinafter described. The chamber 42 is a generally elongated hollow structure disposed with its longitudinal axis parallel to the longitudinal axis of the tank shell and receiving at its one end a tube 43 communicating also with a shell opening 44. The latter is the vent outlet of the tank and is connected overboard of the aircraft or to some other place of low pressure where the air and vapors from the liquid storage tank may be disposed of. That end of the tube 43 communicating with the chamber 42 enters the chamber and extends in spaced relation to the side walls thereof to a point at about the middle of the chamber. Liquid which may be within the chamber 42 is in accordance with this construction and arrangement of parts not permitted readily to enter the tube 43 and be discharged by way of the vent opening 44. As a further aid in this regard, the inner end of the tube 43 may be flattened as indicated and a baffle or the like may be placed to the front of such open end. In normal flight attitudes, liquid within the chamber 42 tends to drain therefrom by way of a tube 40 which is connected at its one end to the chamber and reaches into the normal lower portion of the tank. In inverted flight, the lower end of the tube 40 projects above the liquid level in the tank and thus acts as a conductor for air above the liquid level, directing it to the chamber 42 whence it may escape by the tube 43 to vent opening 44. The tube 40 reaches or extends to the normal lower portion of the tank by a circuitous route which limits substantially the possibility of such tube being used as a route for liquid to the air chamber in inclined positions of the tank resulting from climbing and diving attitudes of the aircraft.

A tube 45 extends forwardly in the tank shell and has its forward or outer end projecting upwardly into the space above the normal liquid level. Similarly, a tube 46 projects rearwardly in the tank shell and above the normal liquid level. At their inner ends, the tubes 45 and 46 communicate with the air chamber 42 through a three-way valve unit 47. The unit 47 comprises a body 48 having projecting boss formations 49, 51 and 52 and an interior chamber 53 in which is a freely movable metal ball 54. The boss 49 receives a bushing 55 suitably formed for a free flow of air therethrough and is adapted to be attracted to the air chamber 42 in a manner to provide open communication between the interior of the air chamber and the chamber 53 in the valve body. The boss 51 is adapted to receive one end of the tube 45 which thus also communicates with the chamber 53. The boss 52 reaches one end of the tube 46 thus communicating this tube also with the chamber 53. Installed in each of the bosses 49, 51 and 52 is a respective valve seat insert 56, 57 and 58 having such tapered formation as to permit the ball 54 to roll to a seated position therein and as so seated effectively to close the affected boss from communication with the chamber 53. Normally the ball 54 lies in the bottom of the chamber 53 and air above the liquid level in the tank is free to flow by way of either or both of the tubes 45 and 46 into the chamber 53 of valve unit 47 and thence to the interior of the air chamber 42 for venting. In the event of a steep climb or dive, as on the order of 90°, the contained body of liqiud may shift so as to encompass or cover both the open end of one of the tubes 45 or 46 and the valve unit 47. Under these conditions, a hydraulic head of pressure is established which may cause liquid to flow up the tube and into the air chamber 42 by way of the valve chamber 53. In response to such climbing or diving movement, however, the ball 54 rolls to a seat upon the insert 58 or upon the insert 57 thus closing the tube 46 or the tube 45 from communication with the chamber 53. The ball 54 is relatively heavy and resists the tendency of the hydraulic head pressure to force liquid up the submerged tube. The oppositely extending tube, it will be understood, projects above the liquid level, when the other tube is submerged, and vents the interior of the tank to the chamber 42. In an inverted flight attitude, the ball 54 seats on the insert 56 and positively precludes access of the liquid to the chamber 42.

During major changes in flight attitudes small amounts of liquid from the interior of the tank may be forced into the chamber 42 in a "slugging" process. Such slugging may be reduced to a minimum by the selective placement of use of the air chamber in conjunction with the vent tube system and the tank vent opening 44. The configuration of the air chamber, and its relationship to the tube 43 therein, as before noted, is such that practically all of the liquid admitted to the chamber during a change in flight attitude will be trapped and allowed to drain back into the tank, by way of the tube 40 as before described.

The tank openings shown in the upper portion thereof in Fig. 5 include the aforementioned return flow opening 38, an opening 59 of general utility, as for example for a connection communicating the engine sump with the tank for vent purposes, and pressure filling and overflow openings 61 and 62. Other openings may be provided in the tank for purposes of drain, for temperature reading and the like.

What is claimed is:

1. A liquid storage tank for use in vehicles assuming in use different attitudes relatively to the earth's surface, including a tank shell having a liquid inlet and a plurality of liquid outlets, the amount of contained liquid in said tank being subject to decrease, and means to discontinue the discharge of liquid from said outlets sequentially in response to a falling liquid level in said tank according to a priority system of supply, at least one of said outlets including a flexible weighted tube and drawing on the contained liquid irrespective of tank attitude.

2. A liquid storage tank for use in vehicles assuming in use different attitudes relatively to the earth's surface, including a tank shell having a liquid inlet and a plurality of liquid outlets, said tank shell having normal upper and lower portions, and individual pick up means for said outlets, one of which is in an intermediate portion of the tank shell and another of which is relatively lower in the tank shell, a falling liquid level in said tank shell descending below said one pick up means to the said other one thereof, said one pick-up means drawing on the contained liquid irrespective of aircraft attitude within a predetermined range of changing liquid levels, said one pick up means being a swivel device extending normally toward the normal lower portion of the tank and shifting in response to a changing attitude of the tank shell in accompaniment with a shifting movement of the contained body of liquid.

3. A liquid storage tank for vehicles assuming in use different attitudes relatively to the earth's surface, including a tank shell having normal upper and lower portions and having further a plurality of liquid outlets in the normal lower portion of the shell, a compartment within said shell enclosing one of said outlets, an opening communicating said compartment with the interior of said tank shell above said one outlet and below the normal liquid level, and a normally open valve controlling said opening and closing in an inverted position of the tank shell.

4. A liquid storage tank according to claim 3, characterized by a flexible pick up member disposed in said compartment to seek the lowest level therein, said member communicating with said one outlet.

5. A liquid storage tank for vehicles assuming in use different attitudes relatively to the earth's surface, including a tank shell having normal upper and lower portions, outlet means communicating with the normal lower portion of the tank, and other outlet means communicating with an intermediate portion of the tank, said last named means including a tube extending toward the bottom portion of the tank shell and of a length to be ineffective upon a predetermined lowering of the liquid level in the tank, said tube being weighted and flexible to follow shifting liquid in the tank due to a change in attitude of the tank.

6. A liquid storage tank for vehicles assuming in use different attitudes relatively to the earth's surface, including a tank shell having normal upper and lower portions, outlet means communicating with the normal lower portion of the tank, other outlet means communicating with an intermediate portion of the tank, said other outlet means including a weighted flexible tube hanging in a dependent position in the shell in any attitude thereof from a point of attachment to the shell, and means to restrict the movements of said tube to limit the amount of liquid which can be drained from the shell thereby to leave in any attitude of the tank a constant predetermined quantity of liquid therein.

7. A liquid storage tank according to claim 6, characterized by further outlet means in said tank shell in the normal lower portion of the tank shell, including an outlet opening in the shell, a compartment enclosing said outlet opening, and an opening in said compartment communicating with the interior of the tank shell and through which said compartment receives liquid, said last named opening being located intermediate the first said outlet means and said other outlet means to preclude draining of the tank by said further outlet means.

8. A liquid storage tank according to claim 7, characterized by a valve closing said opening in said compartment in an inverted position of the tank shell providing for limited continuing liquid supply by way of said further outlet means.

9. A liquid storage tank for use in vehicles assuming in use different attitudes relatively to the earth's surface, including a tank shell having a normal upper portion and a normal lower portion and holding a quantity of liquid, openings in said tank shell to circulate the liquid from the tank and return it thereto, air released from the returning liquid tending to rise above the liquid level in the tank shell, an air chamber in the tank, means for venting said air chamber to the exterior of the tank, said means being located to trap in the air chamber liquid admitted thereto, a plurality of vent tubes each communicating at its one end with said air chamber and opening at its opposite end into a relatively remote part of the tank interior whereby to vent the space above the liquid level in all attitudes of the tank, and means inhibiting liquid loss into said air chamber through said tubes in response to changes in tank attitude, one of said vent tubes opening into the normal lower portion of the tank shell and providing in a normal tank attitude an escape route for liquid admitted to said air chamber.

10. A liquid storage tank for use in vehicles assuming in use different attitudes relatively to the earth's surface, including a tank shell having a normal upper portion and a normal lower portion and holding a quantity of liquid, means defining a relatively stationary air chamber in the normal upper portion of said tank shell, said chamber being vented to the exterior of the tank shell in a manner trapping liquid admitted to said chamber, a plurality of tubes in said shell having their one ends reaching into respectively different parts of the tank interior in such manner that at least one thereof projects above the liquid level in normal, climbing, descending and inverted attitudes of said tank shell, the opposite ends of said tubes communicating with said air chamber, and gravity operated valve means interposed between the opposite end of at least one of said tubes and said air chamber closing communication thereof with said air chamber in an inverted position of said tank shell, another one of said tubes continuously communicating with said air chamber and reaching into the normal lower portion of the tank interior.

11. A liquid storage tank for use in vehicles assuming in use different attitudes relatively to the earth's surface, including a tank shell partly filled with a liquid and having normal upper and lower portions, an air chamber in the normal upper portion of the tank shell vented to the exterior thereof, a vent tube communicating at its one end with said air chamber and reaching into the normal lower portion of the shell to vent said lower portion in an inverted position of the shell, other vent tubes reaching at their one ends respectively into opposite ends of the tank shell in the normal upper portion thereof to vent said upper portion in normal and tilted attitudes of the shell, the opposite ends of said other tubes communicating with said air chamber, and means to limit slugging of liquid out of the tank by way of said vent tubes and air chamber, said last named means including a further vent tube connecting said air chamber to the tank exterior and extending into the interior of said air chamber, the end of said further vent tube within said chamber being spaced from internal walls of said chamber.

12. A liquid storage tank for use in vehicles assuming in use different attitudes relatively to the earth's surface, including a tank shell partly filled with a liquid and having normal upper and lower portions, an air chamber in the normal upper portion of the tank shell vented to the exterior thereof, a vent tube communicating at its one end with said air chamber and reaching into the normal lower portion of the shell to vent said lower portion in an inverted position of the shell, other vent tubes reaching at their one ends respectively into opposite ends of the tank shell, in the normal upper portion thereof to vent said upper portion in normal and tilted attitudes of the shell, a three way valve fitting communicating said other vent tubes with said air chamber, and gravity responsive means in said valve fitting variably effective to close both or either of said other vent tubes from communication with the air chamber, in attitudes of the tank shell other than normal, the said first vent tube communicating continuously with said air chamber and returning to the tank shell in a normal attitude liquid inadvertently admitted to the air chamber during changes in tank attitude.

13. A liquid storage tank for use in aircraft assuming in use normal, climbing, diving and inverted attitudes, including a tank shell partly filled with a liquid, a liquid outlet in the shell and another opening therein for return flow to the tank, means to vent the interior of the tank shell above the liquid level in any of said attitudes, including an air chamber which in climbing, diving and inverted attitudes is at least partly submerged in the liquid within the tank and further including vent tubes communicating at their one ends with said air chamber and reaching at their other ends into different portions of the shell interior, said air chamber communicating with the exterior of the tank shell in a manner trapping in the air chamber liquid admitted thereto, and gravity operated valve means restricting escape of liquid by way of at least one of said vent tubes and air chamber in submerged positions of said chamber, another one of said tubes continuously communicating with said air chamber and reaching into the normal lower portion of the tank interior.

14. A liquid storage tank for use in aircraft and like devices assuming in use different attitudes relatively to the earth's surface, including a tank shell partly filled with a liquid and having normal upper and lower portions, an air chamber in the normal upper portion of the tank shell vented to the exterior thereof, vent tubes reaching at their one ends respectively into opposite ends of the tank shell in the normal upper portion thereof to vent said upper portion in normal and tilted attitudes of the shell, the opposite ends of said tubes communicating with said air chamber, a valve body through which said opposite ends of said tubes communicate with said air chamber, and a gravity operated valve in said body closing the said opposite ends of said vent tubes from communication with said air chamber in an inverted flight attitude or like flight condition reversing gravity forces acting in said tank.

15. A liquid storage tank according to claim 14, characterized by another vent tube communicating at its one end continuously with said air chamber and reaching into the normal lower portion of the shell at its other end to vent said lower portion in an inverted position of the shell and to conduct in a normal attitude of the shell to the lower portion thereof liquid admitted to the air chamber during changes in tank attitude.

16. A liquid storage tank for use in aircraft and like devices assuming in use different attitudes relatively to the earth's surface, including a tank shell partly filled with a liquid and having normal upper and lower portions, an air chamber in the normal upper portion of the tank shell vented to the exterior thereof in a manner trapping in the air chamber liquid admitted thereto, and vent tubes reaching at their one ends into different portions of the tank interior and communicating at their other ends with said air chamber to vent the interior of the tank shell in different tank attitudes, said vent tubes including one communicating at its one end continuously with said air chamber and reaching at its other end into the normal lower portion of the tank shell, said one tube following a circuitous path between said air chamber and the normal lower portion of the tank shell inhibiting a loss of liquid to said air chamber through said one tube in response to changing tank attitudes, liquid admitted to said air chamber returning to the tank shell by way of said one tube in a normal tank attitude.

17. A liquid storage tank for use in aircraft and like devices assuming in use different attitudes relatively to the earth's surface, including a tank shell partly filled with a liquid and having normal upper and lower portions, an air chamber in the normal upper portion of the tank shell vented to the exterior thereof in a manner trapping in the air chamber liquid admitted thereto, vent tubes reaching at their one ends into different portions of the tank interior and communicating at their other ends with said air chamber, one of said vent tubes being in continuous open communication with the normal lower portion of the tank interior and said air chamber to serve as a means for venting the normal lower portion of the tank interior and also as a means to return to the tank interior liquid admitted to the air chamber through said vent tubes in response to changing tank attitudes.

18. A liquid storage tank subject in use to changing gravity forces, including a tank shell to hold a quantity of liquid and having normal upper and lower portions, venting apparatus connected to the tank and including a vent chamber, a tube communicating at its one end with the tank shell exterior and at its other end with an intermediate location in the interior of said vent chamber, a tube intercommunicating said vent chamber and the normal lower portion of the tank interior, and a tube intercommunicating said vent chamber and the normal upper portion of the tank interior.

19. A liquid storage tank subject in use to changing gravity forces, including a tank shell to hold a quantity of liquid and having normal upper and lower portions, there being a normal liquid level in said tank shell, venting apparatus connected to the tank and located above the normal liquid level, including a vent chamber, connections individually communicating said vent chamber with the tank shell interior in the normal upper and lower portions thereof, the connection to the normal lower portion communicating with said vent chamber at the bottom thereof to serve as a drain for liquid admitted to said vent chamber, and a connection from said vent chamber to the shell exterior, said last named connection communicating with said vent chamber above the bottom thereof to trap admitted liquid.

References Cited in the file of this patent

UNITED STATES PATENTS

| 1,871,055 | Hasbrouck | Aug. 9, 1932 |
| 2,374,822 | Le Clair | May 1, 1945 |
| 2,404,765 | Valentyne | July 23, 1946 |
| 2,747,593 | Royer | May 29, 1956 |
| 2,764,172 | Strayer | Sept. 25, 1956 |
| 2,774,365 | Stewart | Dec. 18, 1956 |
| 2,889,843 | Simcock | June 9, 1959 |

FOREIGN PATENTS

| 677,449 | Germany | June 26, 1939 |